UNITED STATES PATENT OFFICE.

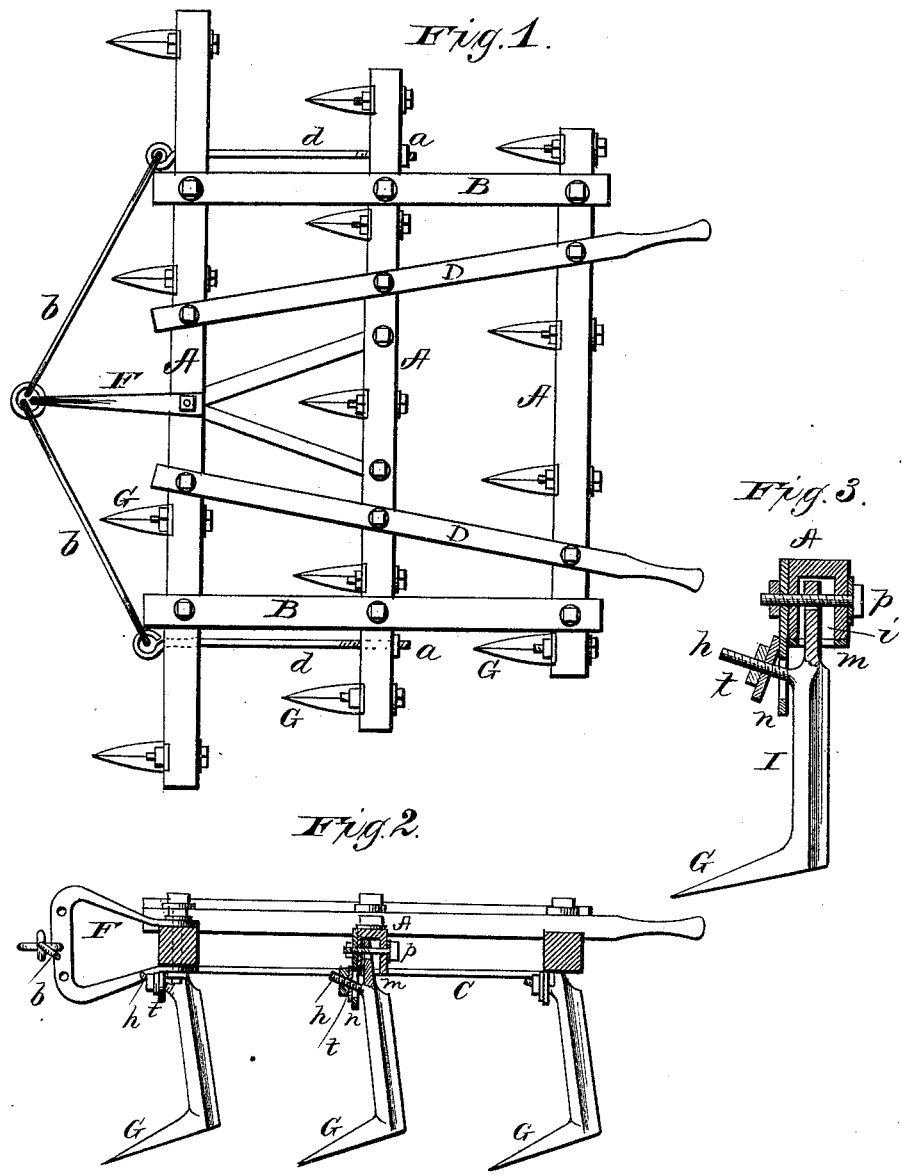

CHARLES D. PRICE, OF EMMETSBURG, IOWA.

IMPROVEMENT IN HARROWS.

Specification forming part of Letters Patent No. 214,446, dated April 15, 1879; application filed January 14, 1879.

*To all whom it may concern:*

Be it known that I, CHARLES D. PRICE, of Emmetsburg, in the county of Palo Alto, and in the State of Iowa, have invented certain new and useful Improvements in Harrows; and do hereby declare that the following is a full, clear, and exact description thereof, reference being had to the accompanying drawings, and to letters of reference marked thereon, making a part of this specification.

The nature of my invention consists in the construction and arrangement of a pulverizing machine or cultivator, which is intended to take the place of the harrow, as will be hereinafter more fully set forth.

In order to enable others skilled in the art to which my invention appertains to make and use the same, I will now proceed to describe its construction and operation, referring to the annexed drawings, in which—

Figure 1 is a plan view of my machine. Fig. 2 is a vertical section of the same; and Fig. 3 is an enlarged detailed view, showing the mode of adjusting the teeth.

The frame of my pulverizer is composed of three parallel bars, A A A, connected by means of two cross-bars, B B, bolted to them, the bolts passing through metal plates C C on the under sides of the bars. The front bar A is the longest, and has four teeth fastened to it. The middle bar is shorter and has five teeth, and the rear bar is the shortest and has four teeth. These teeth are distributed as shown in Fig. 1, making the machine complete to work on corn-stalk ground.

D D are the handles, secured on top of the bars A in inclined position, as shown. F is the clevis, attached by a single bolt at top and bottom of the front bar A. The lower end of the clevis extends rearward in the form of a fork, the prongs of which diverge, and are secured to the under side of the middle bar A. The front portion of the clevis has a series of holes for the up-and-down adjustment of the draft. Rods $b$ $b$ extend from the clevis to the sides, and connect with rods $d$ $d$, these latter rods connecting the two front bars A A, and have nuts $a$ $a$ on their ends.

Each tooth is composed of a shank, I, with forwardly-projecting foot G, the foot being flat on the bottom, pointed, and beveled from a center ridge down toward each side. The shank I is diamond-shaped, with the front edge or corner corresponding with the center ridge of the foot. The upper edge of the shank I is made flat, and has an oval hole through it, and near the upper end of said shank is a screw, $h$, projecting forward and upward, as shown in Fig. 3.

For each tooth there is made in the under side of the bar a recess, $i$, into which the upper flat end of the shank I is inserted. A slotted metal plate, $m$, is placed on the under side of the bar corresponding with said recess, and a metal plate, $n$, is fastened on the front of the bar, and projects down a suitable distance below the bar. The lower end of the plate $n$ is provided with a longitudinal slot, as shown.

In attaching the tooth, the screw $h$ is passed through the slot in the plate $n$, while the upper flat end of the shank is inserted in the recess $i$. A bolt, $p$, is then passed through the bar A and through the hole in the upper end of the shank, which secures the tooth to the bar. A nut, $t$, is then screwed on the end of the screw $h$, whereby the teeth can be adjusted or regulated to run any desired depth.

By adjusting the nut $t$ on the screw $h$ the point of each tooth can be turned up, and the machine will run shallow, or let out and it will run deeper to suit the operator.

Having thus fully described my invention, what I claim as new, and desire to secure by Letters Patent, is—

The combination of the tooth I G, constructed as described, and provided with the screw $h$, the bar A, having recess $i$ and metal plates $m$ $n$, the bolt $p$, and nut $t$, all substantially as and for the purposes herein set forth.

In testimony that I claim the foregoing I have hereunto set my hand this 30th day of November, 1878.

CHARLES D. PRICE.

Witnesses:
M. D. DANIELS,
M. L. BROWN.